May 27, 1930.  C. VON HOFE  1,760,727
FOCUS WATER LEVEL
Filed April 5, 1929
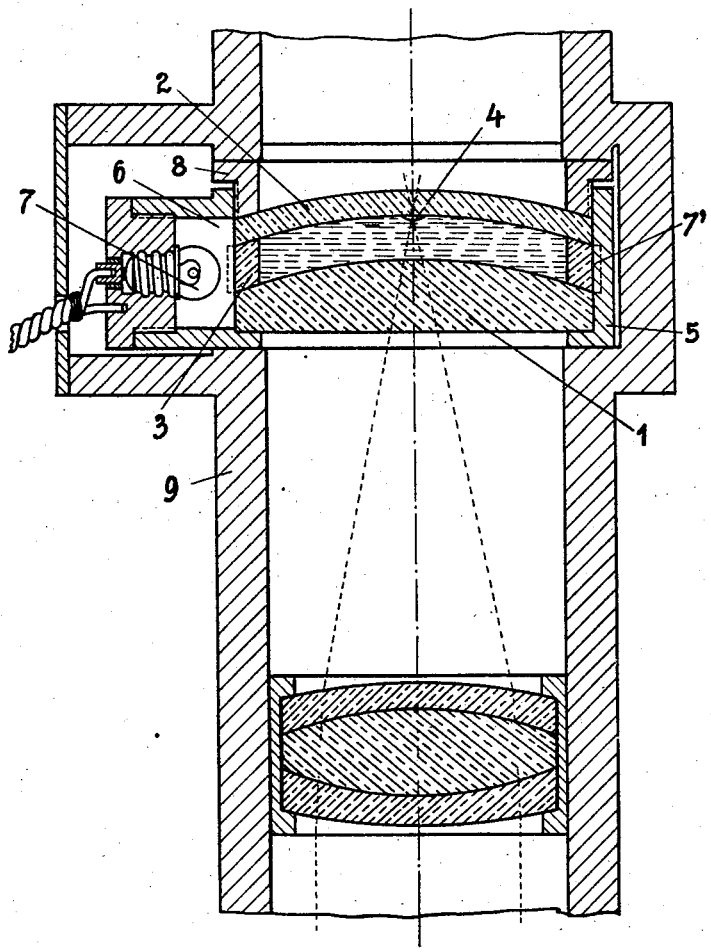
INVENTOR
C. von Hofe
BY Langner, Parry Card Langner
ATTYS.

Patented May 27, 1930

1,760,727

UNITED STATES PATENT OFFICE

CHRISTIAN von HOFE, OF VIENNA, AUSTRIA, ASSIGNOR TO THE CZECHOSLOVAK COMPANY: C. P. GOERZ, OPTISCHE ANSTALT AKTIENGESELLSCHAFT, AKCIOVA SPOLECNOST K. P. GOERZ, OPTICKY USTAV, OF BRATISLAVA, CZECHOSLOVAKIA

FOCUS WATER LEVEL

Application filed April 5, 1929, Serial No. 352,816, and in Germany April 14, 1928.

In aiming devices serving for determining the vertical direction by producing an optical image of an object situated in this direction from an oscillating observing station, for instance from an aircraft, advantageously transparent water levels in the form of a box are used which consist of two glass lenses between which a ring is interposed keeping the lenses at a distance from each other, the space between the two glass lenses being filled with the liquid of the water level so far that there remains only a small air bubble. As is well known such a water level gives, if its plane is in the focal plane of the objective of a sighting telescope and if the radius of the curvature of the water level is equal to the focal distance of the objective, the vertical direction as the direction in which is situated the point covered by the water level bubble of which a sharp image is produced in the field of vision. Heretofore these "focus water levels" could be used only at day time since the outline of the air bubble of the water level disappeared on the dark back ground of the field of vision.

Now in order to enable such aiming devices provided with focus water levels to be used also at night time, the air bubble of the water level is illuminated according to the present invention by a source of light arranged laterally for which purpose the casing of the water level is so constructed that the source of light may be readily located and exchanged, and the rays of light issuing from such source of light are penetrating through the transparent cylindrical parts of the water level into the same. In order to avoid losses in light as far as possible, it is not only advantageous to polish the transparent side faces of the two glass lenses, but also to make of glass the ring required for keeping the lenses at a distance from each other and for forming the liquid chamber and made heretofore always of metal, such ring being advantageously cut from a glass tube. For securing a tight joint for the water level liquid the two end faces of this glass ring have to be ground spherically to correspond to the curvatures of the surfaces of the lenses contacting therewith and have to be cemented to the lenses, or if these ground glass ring faces are well polished the tight joint may be obtained by rubbing under moderate pressure the lenses of the ring after having been brought under the level of the water level liquid in a receptacle.

An embodiment of the invention is illustrated in the annexed drawing by way of example in axial section.

The bottom lens 1 is separated from the covering lens 2 by an interposed ring 3 keeping the two lenses at a distance from each other the top face of this ring, being ground and polished, to the radius of the concave bottom face of the covering lens and its bottom face to the radius of the convex top face of the bottom lens. The liquid contained in the space by these three parts contains a small air bubble 4. The transparent water level in the shape of a box thus constructed in a sleeve 5 provided with a female screw thread, has a lateral radial bore 6 enclosing a small electric incandescent lamp 7. This incandescent lamp serves for laterally illuminating the bubble of the water level through the polished side faces of the glass bodies 1, 2 and it might be also of the glass body 3, these three glass bodies being held together with moderate pressure by a ring 8 screwed into the sleeve 5. The entire set of parts may be inserted through a lateral opening of the telescope 9 into the path of rays of the same.

Instead of the incandescent lamp 7 also a paper ring coated with a light emitting radium composition might constitute the source of light such paper ring being interposed between the glass ring 3 and the casing 5 for which purpose a flat groove 7' (indicated in dotted lines) may be provided in the water level casing 5.

What I claim is:

1. A focus water level comprising a bottom lens, a top lens concave at its bottom side, a transparent ring interposed between the peripheries of the said two lenses, whereby the two lenses are held at a distance from each other and a space is formed between them and the transparent ring, a transparent liquid and an air bubble contained in such space and means for illuminating the said space from the periphery of the said transparent interposed ring.

2. A focus water level comprising a bottom lens, a top lens concave at its bottom side, a transparent ring interposed between the peripheries of the said two lenses, whereby the two lenses are held at a distance from each other and a space is formed between them and the transparent ring, a transparent liquid and an air bubble contained in such space and means for illuminating the said space from the periphery of the said transparent, interposed ring, the end faces of the said ring being ground spherically to the curvature of the lens surfaces with which such end faces are contacting.

3. A focus water level comprising a bottom lens, a top lens concave at its bottom side, a transparent ring interposed between the peripheries of the said two lenses, whereby the two lenses are held at a distance from each other and a space is formed between them and the transparent ring, a transparent liquid and an air bubble contained in such space means for illuminating the said space from the periphery of the said transparent interposed ring, the end faces of the said ring being ground and polished spherically to the curvature of the lens surfaces with which such end faces are contacting whereby tight joints are secured between the end faces of the said ring and the lenses without the use of cement.

In testimony whereof I have affixed my signature.

CHRISTIAN v. HOFE.